United States Patent
Fink et al.

(10) Patent No.: US 11,820,485 B2
(45) Date of Patent: Nov. 21, 2023

(54) ROTARY WING AIRCRAFT WITH A FIREWALL ARRANGEMENT

(71) Applicant: AIRBUS HELICOPTERS DEUTSCHLAND GMBH, Donauworth (DE)

(72) Inventors: Axel Fink, Donauworth (DE); Manuel Kempf, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 249 days.

(21) Appl. No.: 17/190,510

(22) Filed: Mar. 3, 2021

(65) Prior Publication Data
US 2021/0403139 A1    Dec. 30, 2021

(30) Foreign Application Priority Data

Jun. 30, 2020   (EP) .................................... 20400012

(51) Int. Cl.
*B64C 1/16*   (2006.01)
*B64C 1/12*   (2006.01)
(Continued)

(52) U.S. Cl.
CPC ................. *B64C 1/16* (2013.01); *B64C 1/12* (2013.01); *B64C 27/04* (2013.01); *B64C 2001/0072* (2013.01); *B64D 2045/009* (2013.01)

(58) Field of Classification Search
CPC ...... B64C 1/16; B64D 2045/009; B64D 27/14
See application file for complete search history.

(56) References Cited

U.S. PATENT DOCUMENTS 6,112,856 A *  9/2000  Wilson .................. F16N 31/002
                                                              184/106
6,216,823 B1 *  4/2001  Wilson .................. F16N 31/002
                                                              184/106
(Continued)

FOREIGN PATENT DOCUMENTS

EP    2046638 B1    9/2010
EP    2443034 B1    9/2015
(Continued)

OTHER PUBLICATIONS

European Search Report for European Application No. EP 20400012. 9, Completed by the European Patent Office, dated Dec. 17, 2020, 11 pages.

*Primary Examiner* — Philip J Bonzell
(74) *Attorney, Agent, or Firm* — BROOKS KUSHMAN P.C.

(57) ABSTRACT

A rotary wing aircraft with a fuselage that comprises an upper primary skin and an aircraft upper deck arranged above the fuselage, wherein the aircraft upper deck comprises a firewall arrangement that defines a fire proof separation at least between at least one aircraft engine and an aircraft interior region, wherein the firewall arrangement comprises at least one funnel-shaped lower firewall that is arranged between the at least one aircraft engine and the upper primary skin of the fuselage, wherein the at least one funnel-shaped lower firewall converges from an outer perimeter to at least one inner collecting point, and wherein the outer perimeter is spaced apart from the upper primary skin of the fuselage.

17 Claims, 8 Drawing Sheets

(51) Int. Cl.
*B64C 27/04* (2006.01)
*B64C 1/00* (2006.01)
*B64D 45/00* (2006.01)

(56) References Cited

U.S. PATENT DOCUMENTS

| | | | | |
|---|---|---|---|---|
| 6,446,907 | B1* | 9/2002 | Wilson | F16N 31/002 244/17.11 |
| 6,612,823 | B2 | 9/2003 | Bandou et al. | |
| 8,096,496 | B2* | 1/2012 | Wilson | F16N 31/002 244/17.11 |
| 8,317,127 | B2* | 11/2012 | Wilson | F16N 31/002 244/17.11 |
| 8,820,045 | B2* | 9/2014 | DeDe | F01D 11/005 60/800 |
| 9,073,630 | B2* | 7/2015 | Wilson | F16N 31/002 |
| 9,285,077 | B2* | 3/2016 | Wilson | F16N 31/002 |
| 9,358,410 | B2* | 6/2016 | Jullie | B64D 29/00 |
| 9,447,920 | B2* | 9/2016 | Wilson | B64D 27/00 |
| 9,868,545 | B2 | 1/2018 | Brochard et al. | |
| 9,897,254 | B2* | 2/2018 | Wilson | B64D 47/00 |
| 10,625,851 | B2* | 4/2020 | Wilson | F16N 31/002 |
| 11,248,743 | B2* | 2/2022 | Emrich | F16N 31/002 |
| 2009/0159739 | A1* | 6/2009 | Wilson | F16N 31/002 244/17.11 |
| 2009/0314899 | A1 | 12/2009 | Porte et al. | |
| 2012/0023896 | A1* | 2/2012 | DeDe | F23R 3/002 60/39.094 |
| 2012/0023897 | A1* | 2/2012 | DeDe | F02C 7/25 60/39.094 |
| 2012/0082808 | A1 | 4/2012 | Lemains et al. | |
| 2012/0312914 | A1* | 12/2012 | Wilson | B32B 38/0004 244/17.11 |
| 2015/0175272 | A1 | 6/2015 | Brochard et al. | |
| 2015/0197346 | A1* | 7/2015 | Jullie | B64D 29/00 244/129.2 |
| 2017/0240265 | A1 | 8/2017 | Poster | |
| 2018/0156131 | A1 | 6/2018 | Olson | |
| 2020/0109816 | A1* | 4/2020 | Emrich | F16N 31/006 |

FOREIGN PATENT DOCUMENTS

| | | |
|---|---|---|
| EP | 3056423 A1 | 8/2016 |
| EP | 2917532 B1 | 4/2019 |
| EP | 3556661 A1 | 10/2019 |
| WO | 2012169906 A1 | 12/2012 |

* cited by examiner

ROTARY WING AIRCRAFT WITH A FIREWALL ARRANGEMENT

CROSS-REFERENCE TO RELATED APPLICATIONS

This application claims priority to European patent application No. EP 20400012.9 filed on Jun. 30, 2020, the disclosure of which is incorporated in its entirety by reference herein.

BACKGROUND OF THE INVENTION

(1) Field of the Invention

The present embodiments are related to a rotary wing aircraft with a fuselage that forms an aircraft interior region, the fuselage comprising an upper primary skin that separates the aircraft interior region from an aircraft upper deck arranged above the fuselage, wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region. The present invention further relates to a suitable firewall for an engine compartment of a rotary wing aircraft.

(2) Description of Related Art

In a rotary wing aircraft, such as a small or medium-size helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

The aircraft upper deck generally includes an engine accommodating region that accommodates one or more engines, typically air breathing gas turbines, and that is, therefore, also referred to as the "engine deck". The one or more engines are adapted for driving the rotary wing aircraft, e.g. by providing power to an associated power distribution unit, such as a gearbox, which then provides this power to a suitable propelling unit, such as e.g. a rotor, propeller or other.

Typically, the engines are arranged outside of the aircraft interior region, on top of the fuselage and close to the other main components of a respective powerplant, the main gear box and the main rotor. This is crucial for the entire aircraft performance, safety and reliability.

More specifically, according to airworthiness certification regulations the engine deck of a given rotary wing aircraft must be fire proof in a fire event. Basically, each engine has to be isolated from the rest of the rotary wing aircraft and the engine deck has to be designed such as to prevent corrosion and to prevent hazardous substances passing from a respective engine compartment to other parts of the rotary wing aircraft. Moreover, an associated primary structure enclosed within the engine compartment has to be capable of sustaining limit load during a fire event of 15 min of duration. Adequate assumptions have to be made regarding a possible size and location of damage on the primary structure of the rotary wing aircraft. No burn through or backside flame ignition is acceptable and respectively employed materials must behave self-extinguishing after flame exposure. These measures are independent of additional fire extinguishing systems.

In particular, the engine deck must be capable of sustaining service temperatures without deterioration of load carrying or fire proof capabilities. Respective operating temperatures acting on the aircraft upper deck as a whole are a result of the heat radiation of the engines and are essentially a function of the location within the engine compartment, the engine proximity, the compartment design and the engine characteristics among others. Typically, higher temperatures are present at the rear section of the engine compartment close to an associated engine combustion chamber and an associated exhaust. In fact, typical operating temperatures of the engine deck range from about 70° C. to 300° C.

As a result, each engine compartment and, more generally, the engine deck as a whole is equipped with a suitable firewall arrangement which forms a fire protection zone. The fire protection zone accommodates the engines within the firewall arrangement such that the firewall arrangement defines a fire proof separation between the engines, towards the forward and aft regions of the engine deck and the aircraft interior region formed by the fuselage of a given rotary wing aircraft.

More specifically, a firewall arrangement in an engine deck is typically delimited by the upper primary skin of the fuselage that forms a lower firewall, as well as by a front firewall, a rear firewall, and a cowling that represents an upper loft of a given rotary wing aircraft and covers the engine deck. If the rotary wing aircraft is a twin-engine aircraft, both engines are usually separated from each other by a center firewall protecting both engines from each other. In any case, the engines are attached to the upper primary skin and corresponding framework members such as beams or frames by means of several engine mounts. The front firewall and the rear firewall represent a barrier to respective front and rear portions of a given aircraft upper deck. The cowling is usually at least partially removable to provide access to the engines.

Exemplary firewall arrangements are described in the documents, EP 2 046 638 B1, EP 2 443 034 B1, EP 2 917 532 B1, U.S. Pat. No. 9,868,545 B2, and US 2018/0156131 A1.

More particularly, the document EP 3 556 661 A1 describes a rotary wing aircraft with an engine compartment that is provided with a firewall arrangement. The firewall arrangement includes a front firewall and a center firewall. The front firewall has an upper firewall portion and a lower firewall portion.

The document EP 3 056 423 A1 describes a rotary wing aircraft with a fuselage that defines at least an interior region and an engine accommodating region that is arranged inside of the fuselage and comprises at least one fire protection zone that is defined by at least one associated firewall arrangement. The at least one fire protection zone accommodates at least one engine within the at least one associated firewall arrangement such that the associated firewall arrangement defines a fire-resistant separation between the at least one engine and the interior region of the fuselage. The at least one associated firewall arrangement comprises a plurality of interconnected firewalls that delimit the at least one fire protection zone, including a front firewall, a rear firewall, a lower firewall, and a mid firewall.

Usually, in such a firewall arrangement the respective front and rear firewalls are secondary parts which are typically made of titanium sheet. In contrast to these front and rear firewalls, the upper primary skin that forms the lower firewall is part of the primary structure of the rotary wing aircraft and, thus, integrated into the primary structure's global load carrying duty. The global load carrying duty refers to carrying of global loading to which the rotary wing aircraft is subjected and which is mainly defined by shear and normal in-plane load flows which are e.g. for medium-size helicopters in the range of 50 N/mm to 80 N/mm.

More specifically, local load introduction into the primary structure of the rotary wing aircraft is generally supported by the engine deck of the rotary wing aircraft. Main load introduction is associated to a respective inertia load of the aircraft engines that results in a transversal loading of the engine deck and, therefore, requires a dedicated stiffening framework structure. The latter is designed on the basis of driving load factors that are essentially determined by predetermined emergency landing load cases, crash and engine blade failure scenarios, as well as support stiffness requirements.

Hence adequate materials and structural arrangements have to be found, at least with respect to the upper primary skin, which cope with simultaneous and challenging structural, thermal and systemic duties. As a consequence, the upper primary skin in the engine deck is usually designed as a flat stiffened construction in the form of stiffened skin titanium panels made of titanium skin and titanium stringers. The stiffened skin titanium panels are designed as part of the primary structure of the rotary wing aircraft while simultaneously providing for sufficient thermal and burn-through resistance in operating conditions and in a fire event. Typical thicknesses of the titanium skin range from 0.6 mm to 0.8 mm. Fire resistance is deemed to be achieved with a minimum thickness of 0.4 mm.

Furthermore, the upper primary skin made of stiffened skin titanium panels is usually supported by an internal framework of the fuselage that is composed of frames and longitudinal and transversal beams which are typically made of aluminum and carbon composite, mainly react the local load introduction of the engines and provide support to the firewall arrangement. However, the stiffened skin titanium panels are substantially heavier in comparison to comparable aluminum or carbon composite structures which are used in other regions of the fuselage.

Moreover, local insulation blankets are typically used to insulate and protect respective components and mounts of the internal framework, as they are, especially in a fire scenario, severely affected by heat conduction through the upper primary skin. In fact, due to the above-described small gauges a respective backside temperature of a given stiffened skin titanium panel is practically the same as the one on the fire exposed face. This leads to potential issues with elevated operational temperatures on framework structural parts of the primary structure and their mechanical deterioration as well as back side fire ignition risks, hence requiring additional means for fire protection.

In addition, since the upper primary skin is essentially flat in order to be optimally integrated into the primary structure's global load carrying duty, special drawbacks arise with regard to respective drainability requirements and an associated implementation of drainage means. In particular, each engine compartment must have a complete drainage system in order to minimize hazards resulting from failure or malfunction of any component inside of the engine compartment that contains a flammable fluid. The drainage system must cover each engine compartment at each accumulation area and must be effective at all relevant flight conditions. Accordingly, with regard to all relevant flight conditions and an underlying necessity to drain at all accumulation regions of a given firewall arrangement, usually four drainage points are arranged at respective distal corners of each individual engine compartment.

Furthermore, the upper primary skin, which consists of stiffened skin titanium panels, must be able to sustain limit load in a fire event, i.e. a respective maximum expectable flight load. However, in response to direct fire exposure of such stiffened skin titanium panels severe mechanical properties' degradation may occur, so that adequate assumptions must be met in order to cover the most critical fire conditions in terms of deterioration type, size and location, hence leading to challenging assessment, substantiation and certification processes. Respective residual strength requirements inevitably lead to an oversized upper primary structure with respect to normal flight load conditions.

More specifically, engine decks with stiffened skin titanium panels are especially prone to develop fatigue cracks and must be carefully designed with regard to vibrations, built-in stresses and instabilities. It has to be considered that titanium loses about quarter of its strength in operational conditions at the exposure of maximum temperatures within an engine compartment. In a fire event it almost entirely loses its load bearing capability, however, it still ensures its fire barrier function. Especially in view of the residual strength requirements and the uncertainty in terms of damage size and its allocation in a fire event, the load carrying stiffened skin titanium panels exhibit a poor overall weight efficiency and robustness. This fact is even more aggravated under consideration of typical drainage concepts, since numerous drainage points and associated pipes are required to ensure drainability at all relevant flight conditions and aircraft attitudes.

In other words, a required compatibility with operational temperatures, drainage capabilities, as well as requirements on fire resistance/proofness and residual strength lead in global terms to important drawbacks in terms of weight efficiency and robustness, substantially increasing an overall weight of the engine deck and, consequently, of the rotary wing aircraft. In particular, the upper primary skin with the stiffened skin titanium panels is approximately twice as heavy as a corresponding composite structure, especially when being designed regarding low post-buckling factors, meaning that buckling is not allowed at a large percentage of maximum applied load. Furthermore, repeated elastic buckling distortions lead to accelerated crack formation and growth of the titanium skin. However, the resistance of standard composite materials and thin-walled composite structures against high operating temperatures is low and their fire resistance behavior and residual strength are very deficient. Therefore, conventional composite structures and their outstanding weight efficiencies and fatigue resistance characteristics cannot be exploited in a firewall arrangement of an engine compartment on the engine deck. As a result, the firewall arrangement of an engine compartment on the engine deck still remains one of the inevitable metallic components of rotary wing aircrafts.

BRIEF SUMMARY OF THE INVENTION

It is, therefore, an object of the present invention to provide a new rotary wing aircraft with an engine deck and a firewall arrangement having improved overall weight efficiencies and robustness overcoming the above-mentioned deficiencies of conventional metallic engine decks. This object is solved by a rotary wing aircraft having the features of claim 1.

More specifically, according to the present invention a rotary wing aircraft comprises a fuselage that forms an aircraft interior region, wherein the fuselage comprises an upper primary skin that separates the aircraft interior region from an aircraft upper deck arranged above the fuselage. The aircraft upper deck comprises an engine accommodating region with a firewall arrangement, wherein the engine accommodating region accommodates at least one aircraft engine within the firewall arrangement such that the firewall arrangement defines a fire proof separation at least between the at least one aircraft engine and the aircraft interior region. The firewall arrangement comprises at least one funnel-shaped lower firewall that is arranged between the at least one aircraft engine and the upper primary skin of the fuselage, wherein the at least one funnel-shaped lower firewall converges from an outer perimeter to at least one inner collecting point. The outer perimeter is spaced apart from the upper primary skin of the fuselage.

Preferably, the firewall arrangement defines a fire proof separation between the at least one aircraft engine and other adjacent aircraft regions. Such other adjacent aircraft regions include the aircraft interior region, as well as e.g. an engine compartment(s) of a further aircraft engine(s), and forward and aft regions to the engine accommodating region, such as e.g. gearbox or exhaust accommodating regions.

Advantageously, by forming the firewall arrangement with a lower firewall that is separate from the upper primary skin of the fuselage and, thus, not implemented by means of the upper primary skin, the inventive rotary wing aircraft comprises an engine deck that corresponds to the engine accommodating region of the aircraft upper deck and that, compared to conventional engine decks, does not represent a multifunctional solution with an upper primary skin that simultaneously assumes fire protection, thermal stability, drainage and global load carrying duty. Instead, all these functions are separated by providing on the one hand the lower firewall for fire protection, thermal stability and drainage, and on the other hand the upper primary skin for the global load carrying duty. Furthermore, the lower firewall simultaneously protects a direct connection of respective engine mounts to associated structural framework members, which is often considered one of the most critical thermal paths.

More specifically, the engine deck is composed of a portion of the aircraft upper deck and a secondary fire barrier structure, i.e. the firewall arrangement. The aircraft upper deck and, more particularly, its upper primary skin, contributes to the global load carrying duty of the rotary wing aircraft's fuselage, whereas the secondary barrier structure is uninvolved in the overall load carrying behavior of the fuselage, due to its particular spatial arrangement within the engine accommodating region.

In particular, the firewall arrangement allows to fully eliminate damage on the aircraft's primary structure, i.e. the fuselage, in a fire case by confining it within secondary protection elements, i.e. the firewall arrangement, within respective engine compartments. Thus, any repair actions on the aircraft's primary structure after a fire may be eliminated or at least reduced to a minimum.

Advantageously, the upper primary skin in the engine deck, i.e. the engine deck skin, is at least essentially aligned with the structure of the aircraft upper deck ahead and behind the engine deck, i.e. respective front and rear deck skins, and represents a structural continuity of the respective front and rear deck skins. The engine deck skin is preferentially made of composite materials according to standard construction principles, using, for instance, composite sandwich shell designs or alternatively stiffened composite skins. The engine deck skin is preferentially at least essentially flat, hence allowing for an optimal structure mechanical behavior as part of the fuselage.

Accordingly, the advantages of composite materials used for implementation of primary structural applications, i.e. the engine deck skin, may advantageously be exploited. Considering the large weight drawbacks of conventional titanium engine deck skins in comparison to composite structure engine deck skins, the functional separation into a primary composite panel on the one hand, which forms the engine deck skin and is not affected by high operational temperatures or by direct fire, and a secondary thin barrier structure that provides the required thermal and fire protection to the engine deck skin, as well as a possible support of system components on the other hand, leads to a substantial increase of an underlying overall weight efficiency of the engine deck. This overall weight efficiency is even more pronounced as a result of implementing an entire drainage function into the barrier structure, thus, allowing for a considerable reduction of a required number of drainage points and associated drainage pipes to a minimum.

The separation of functions enables, in this special case, a more effective material selection and design principle as a function of the respective specific functionality. In fact, the fuselage can be entirely decoupled from the fire area, thus, allowing for a more efficient and independent selection of respective design principles and materials. No further protection means, such as blankets, are needed for the protection of the fuselage.

Preferably, the at least one funnel-shaped lower firewall forms a barrier structure that features a three-dimensional funnel-shaped geometry with the outer perimeter that is allocated distantly above the engine deck skin. Preferentially, the outer perimeter is attached to the front, rear and center firewall as well as respective fuselage side shells which form suitable firewall mounts, hence spanning over the entire footprint of a respective engine compartment. A lowest point of the funnel-shape barrier structure is preferably allocated at a predetermined distance below the engine deck skin. As a result, an overall geometry of the funnel-shaped barrier structure passes through an underlying engine deck skin plane, thus, defining an intersection perimeter within the engine deck skin, which in turn defines a specific cut-out on the aircraft upper deck. The barrier structure hence features an upper barrier portion above the engine deck skin plane, and a lower barrier portion below the engine deck skin plane. Thus, for flight load cases the barrier structure and the engine deck skin stabilize each other at the intersection perimeter.

In other words, the aircraft upper deck preferably features one specific cut-out at each engine compartment with an intersection perimeter at which an associated funnel-shaped barrier structure is interconnected to. Due to the offset arrangement of the funnel-shaped barrier structure with respect to the engine deck skin plane, this barrier structure is uninvolved within the overall load carrying behavior of the fuselage.

In fact, a fully covered uninterrupted engine deck skin is considered not to be required for carrying applied global loads for small and medium-size helicopters. This is particularly the case when using conventional sandwich constructions with minimum arrangement characteristics.

Accordingly, the cut-outs lead to a further overall weight saving since no further structural reinforcement is required.

Advantageously, the funnel-shaped geometry of the barrier structure builds a gap volume with respect to the engine deck skin. Thus, the barrier structure protects the engine deck skin as an effect of their mutual distance, as air is a very efficient isolator.

Preferably, an interconnection edge member which is preferentially heat-resistant with low thermal conductivity is implemented as interconnection member between the funnel-shaped barrier structure and the engine deck skin, which is preferably made of carbon composite. This interconnection edge member preferably thermally decouples both components from each other. Advantageously, the interconnection edge member contributes to the stabilization of the free edge perimeter of the engine deck skin's cut-out and is made of either metallic material, such as titanium or steel, or non-metallic material, such as ceramics or composites.

Advantageously, the lower barrier portion of the barrier structure incorporates drainage points of an associated drainage system. Several drainage points may be suitable, but more particularly only a single drainage point is preferably incorporated within the lower barrier portion. The lowest point of the funnel-shape barrier structure preferentially corresponds to a single drainage point at each individual engine compartment. However, more than one drainage points may likewise be provided. The funnel-shaped geometry of the barrier structure is advantageously designed so as to cover all relevant flight attitudes always ensuring a residual slope to efficiently canalize fluids towards the single drainage point.

More specifically, the cut-out shape of the engine deck skin is a result of the three-dimensional shape of the barrier structure and, hence, essentially a function of the position of the drainage point, required slopes and allocation and shape of the outer perimeter. Advantageously, the cut-out adopts an ellipsoidal shape which is considered advantageous in view of the load carrying function of the engine deck skin, avoiding severe stress concentrations. In view of the moderate load levels of the engine deck skin of small to medium-size helicopters, the cut-outs do not cause a negative effect on the mechanical behavior of the engine deck skin.

Preferably, the funnel-shaped barrier structure is made of minimum gauge titanium sheet with respect to fire proof performance. Its three-dimensional shape imparts an inherent geometrical stability of the barrier structure. The barrier structure may similarly be made of alternative metallic or non-metallic high temperature resistant and fire proof materials, such as ceramics, in particular fiber reinforced ceramics, hybrid organic-inorganic composites or high temperature and fire proof polymeric composite materials. Ceramics are weight-efficient, but brittle and not well suited for primary structural applications such as the fuselage. In the present case, however, they are suitable materials for the barrier structure since it is uninvolved in the primary load carrying duty.

Alternatively, the barrier structure is a hybrid structure using a combination of two materials with different similar fire proof capabilities, but different thermal resistance characteristics. Hence, for instance, the front part of the barrier structure, which is subjected to lower operational temperatures, may be made of coated composite materials, whereas the rear part of the barrier structure, which is subjected to higher operational temperatures, may be made of titanium, steel, or ceramics.

Optionally, the funnel-shaped barrier structure may be used as carrier element for system components like pipes, connectors, harnesses. Thus, a respective systemic complexity may be integrated within the secondary barrier structure and the attachments on the aircraft's upper primary skin may be kept to a minimum, therefore, reducing possible impacts on the aircraft's primary structure.

Advantageously, the barrier structure is removable. Thus, it may easily be dismounted and exchanged in case of damage. This likewise applies to the front and rear firewalls.

According to one aspect, the firewall arrangement further comprises at least a front firewall and a rear firewall, wherein the outer perimeter of the at least one funnel-shaped lower firewall is at least attached to the front firewall and the rear firewall.

According to one aspect, the outer perimeter of the at least one funnel-shaped lower firewall is removably attached to the front firewall and the rear firewall.

According to one aspect, the at least one funnel-shaped lower firewall forms a carrier element for at least one aircraft system component, wherein the at least one aircraft system component preferably comprises at least one of a pipe, a harness, or a connector.

According to one aspect, the upper primary skin of the fuselage comprises at least one cut-out, wherein a center portion of the at least one funnel-shaped lower firewall is arranged inside of the at least one cut-out.

According to one aspect, the at least one cut-out comprises an inner perimeter, wherein a heat-resistant interconnection edge member that preferably comprises a fire proof material is arranged at the inner perimeter, and wherein the center portion of the at least one funnel-shaped lower firewall is connected to the heat-resistant interconnection edge member.

According to one aspect, the center portion of the at least one funnel-shaped lower firewall comprises the at least one inner collecting point that is arranged inside of the at least one cut-out of the upper primary skin such that the at least one inner collecting point is located inside of the aircraft interior region.

According to one aspect, the at least one funnel-shaped lower firewall covers an entire footprint of an associated engine compartment located in the engine accommodating region.

According to one aspect, the at least one cut-out spans over a range of 20% to 80% of the entire footprint of the associated engine compartment located in the engine accommodating region.

According to one aspect, the at least one inner collecting point of the at least one funnel-shaped lower firewall comprises a drainage hole that is connected to an associated drainage system.

According to one aspect, the at least one funnel-shaped lower firewall comprises a fire proof material, including at least one of titanium, steel, ceramics, a polymeric composite, or a hybrid organic-inorganic composite.

According to one aspect, the upper primary skin of the fuselage comprises a polymeric composite, in particular a carbon fiber reinforced polymer.

According to one aspect, the engine accommodating region comprises at least two adjacent engine compartments that are separated from each other by means of a mid firewall, each one of the at least two adjacent engine compartments comprising an associated funnel-shaped lower firewall.

According to one aspect, the upper primary skin of the fuselage contributes to global load carrying of the fuselage, wherein the at least one funnel-shaped lower firewall is uninvolved in the global load carrying.

The present invention further provides a funnel-shaped firewall for an engine compartment of a rotary wing aircraft, which converges from an outer perimeter to an inner collecting point. The outer perimeter is removably attachable in the engine compartment, and the inner collecting point comprises a drainage hole that is connectable to an associated drainage system of the rotary wing aircraft.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
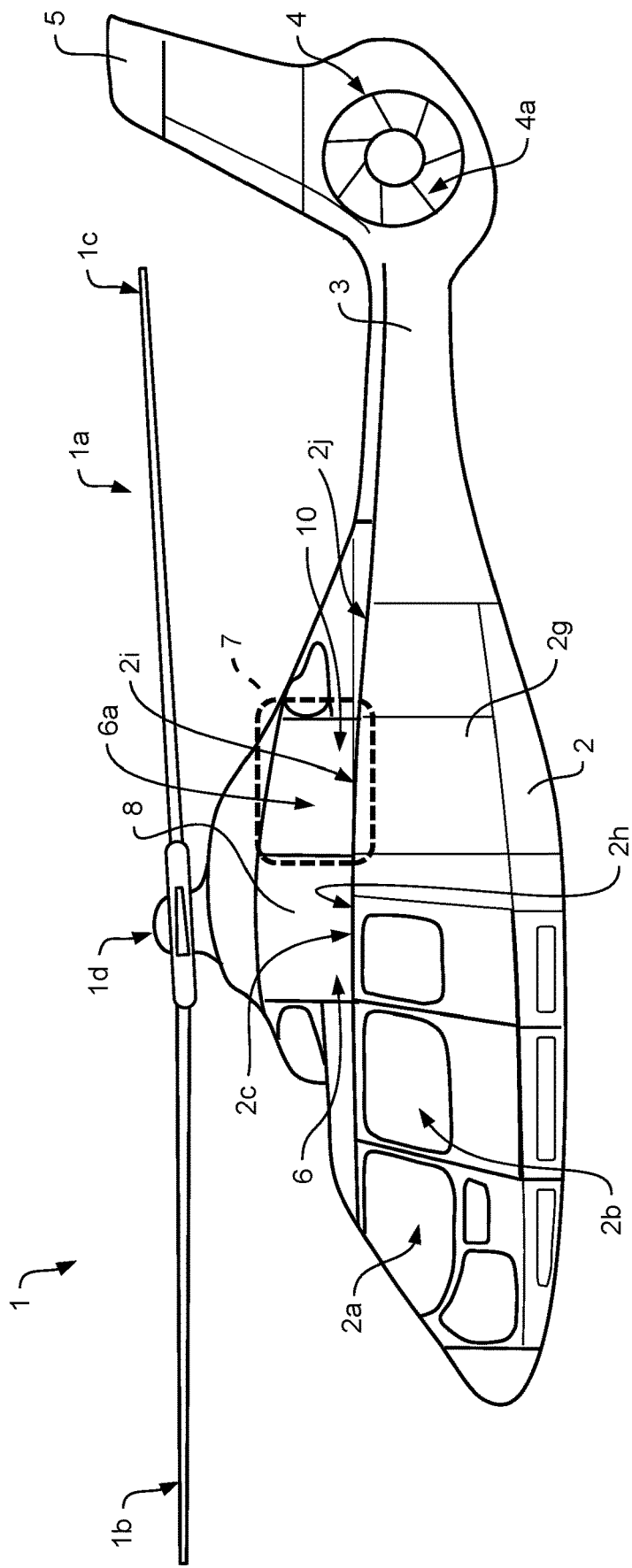
FIG. 1 shows a lateral view of a rotary wing aircraft with an engine accommodating region according to the invention, which is covered by a cowling.

FIG. 1 shows a rotary wing aircraft 1 that is exemplarily illustrated as a helicopter. Thus, for purposes of simplicity and clarity, the rotary wing aircraft 1 is hereinafter referred to as the "helicopter 1". The present invention is, however, not limited to helicopters and can likewise be applied to any other vehicle, in particular to vehicles wherein fluids, especially flammable fluids, must be canalized in specific situations towards one or more associated drainage points.

Preferably, the helicopter 1 comprises at least one multi-blade main rotor 1a for providing lift and forward or backward thrust during operation. The at least one multi-blade main rotor 1a preferentially comprises a plurality of rotor blades 1b, 1c that are mounted at an associated rotor head 1d to a rotor shaft, which rotates in operation of the helicopter 1 around an associated rotor axis.

Illustratively, the helicopter 1 comprises a fuselage 2 that forms an aircraft interior region 2a, 2b. The aircraft interior region 2a, 2b preferably accommodates at least a cockpit 2a and may further accommodate a cabin 2b for passengers and/or cargo. By way of example, a tail boom 3 is connected to the fuselage 2 of the helicopter 1.

The helicopter 1 illustratively further comprises at least one preferentially shrouded counter-torque device 4 configured to provide counter-torque during operation, i.e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

According to one aspect, the fuselage 2 comprises an upper primary skin 2c that separates the aircraft interior region 2a, 2b from an aircraft upper deck 6 arranged above the fuselage 2. In other words, the upper primary skin 2c forms an upper end of the fuselage 2.

Illustratively, the upper primary skin 2c includes a front deck skin 2h, an engine deck skin 2i, and a rear deck skin 2j. The engine deck skin 2i is associated with an engine deck 6a that is part of the aircraft upper deck 6 and that illustratively forms an engine accommodating region 7 with a firewall arrangement 10. Preferably, the aircraft upper deck 6 and, more particularly, at least the engine deck 6a is covered by a cowling 8 that is mounted on top of the fuselage 2.

Preferably, the fuselage 2 includes side shells 2g (and 2f in FIG. 2) which illustratively encase the aircraft interior region 2a, 2b and which are mounted to interconnected frames (2d, 2e in FIG. 2) and longitudinal beams (2k in FIG. 8) to form a primary structure of the helicopter 1 that is designed and adapted for global load carrying duties. Thus, the fuselage's upper primary skin 2c is also involved in these global load carrying duties and, consequently, contributes to global load carrying of the fuselage 2.

Figure 2:
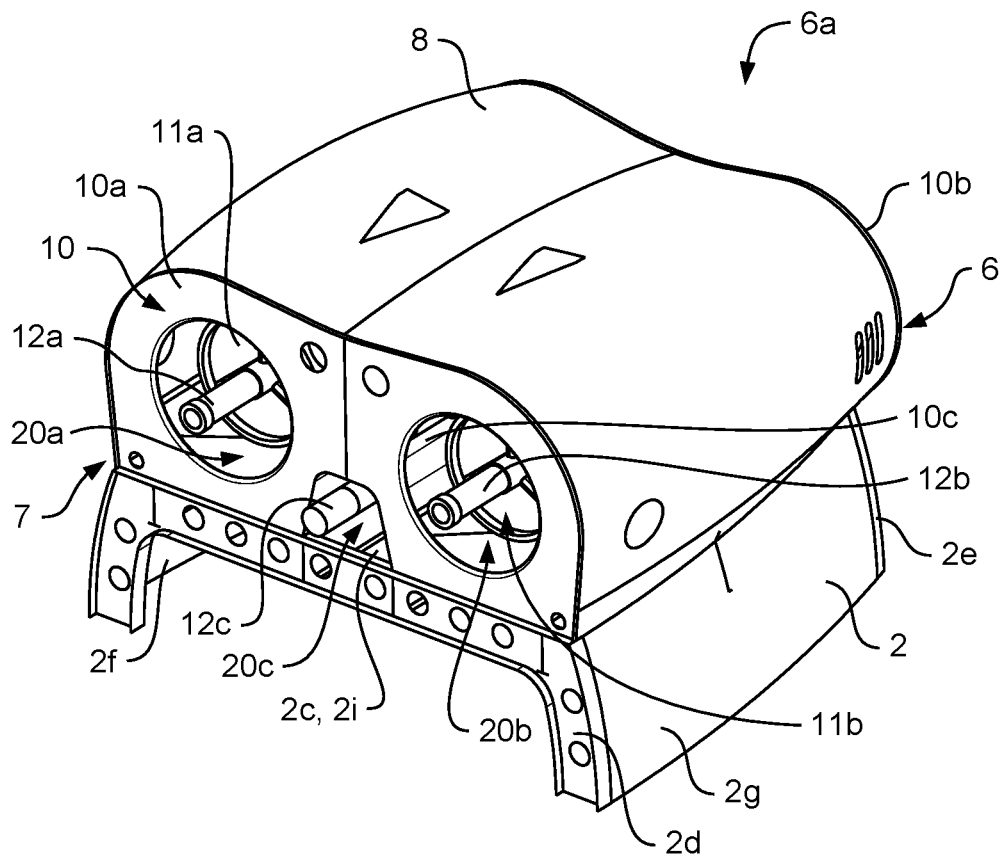
FIG. 2 shows a perspective view of the engine accommodating region of FIG. 1.

FIG. 2 shows the engine deck 6a of FIG. 1 which is part of the aircraft upper deck 6 of the helicopter 1 of FIG. 1 and that forms the engine accommodating region 7 with the firewall arrangement 10 and the cowling 8. The engine deck 6a is arranged above the fuselage 2 of FIG. 1, which includes by way of example the side shell 2g and a further side shell 2f. Both side shells 2f, 2g are at least mounted to first and second frames 2d, 2e of the fuselage 2, which are associated with the engine deck 6a and, therefore, also referred to as the "front frame 2d" and the "rear frame 2e", for simplicity and clarity. By way of example, the front and rear frames 2d, 2e delimit the engine deck 6a, i.e. the engine accommodating region 7, in the longitudinal direction of the helicopter 1 of FIG. 1.

According to one aspect, the engine accommodating region accommodates at least one aircraft engine within the firewall arrangement 10 such that the firewall arrangement 10 defines a fire proof separation at least between the at least one aircraft engine and the aircraft interior region (2a, 2b in FIG. 1).

More generally, the firewall arrangement 10 preferably defines a fire proof separation between the at least one aircraft engine and other adjacent aircraft regions. Such other adjacent aircraft regions include the aircraft interior region (2a, 2b in FIG. 1), as well as e.g. an engine compartment(s) of a further aircraft engine(s), and forward and aft regions to the engine accommodating region 7, such as e.g. gearbox or exhaust accommodating regions.

Illustratively, the engine accommodating region 7 accommodates two aircraft engines 11a, 11b within the firewall arrangement 10. Each aircraft engine 11a, 11b is preferably arranged in an associated engine compartment 20a, 20b. By way of example, two adjacent engine compartments 20a, 20b are provided.

Preferably, the two aircraft engines 11a, 11b are embodied as air breathing propulsion gas turbines, which combust a fuel/air mix for power generation. Illustratively, each aircraft engine 11a, 11b has an associated drive shaft 12a, 12b, e.g. for driving an associated main gearbox of the helicopter 1 of FIG. 1.

According to one aspect, the two aircraft engines 11a, 11b and, thus, the two adjacent engine compartments 20a, 20b are covered by the cowling 8 and separated from each other by means of a mid firewall 10c of the firewall arrangement 10. The mid firewall 10c preferably forms a drive shaft channel 20c for a tail rotor drive shaft 12c.

The firewall arrangement 10 illustratively further includes at least a front firewall 10a and a rear firewall 10b. Preferably, each one of the front firewall 10a, the rear firewall 10b, and the mid firewall 10c comprises a fire proof material, including at least one of titanium, steel, ceramics, a polymeric composite, or a hybrid organic-inorganic composite. In one realization, at least one of the front firewall 10a, the rear firewall 10b, or the mid firewall 10c has a titanium skin with a minimum thickness of 0.4 mm, preferably with a thickness in a range from 0.6 mm to 0.8 mm.

Figure 3:
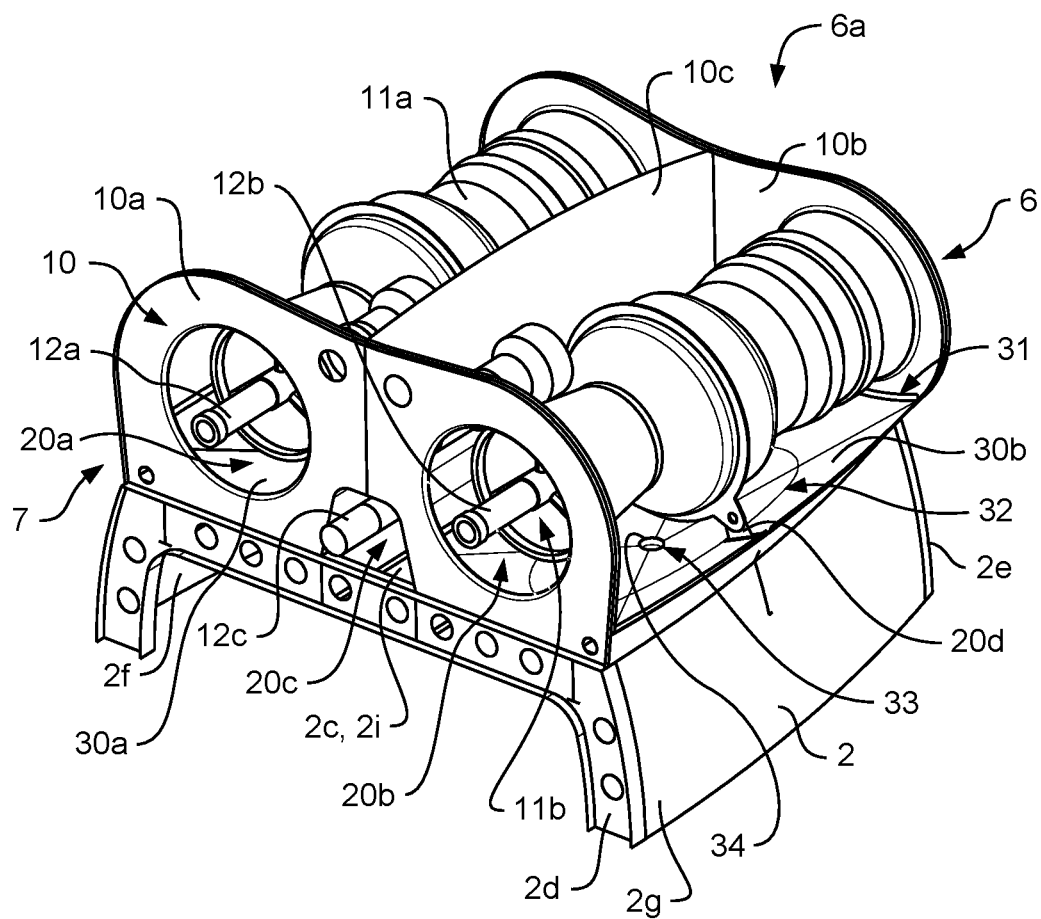
FIG. 3 shows a perspective view of the engine accommodating region of FIG. 2 without the cowling.

FIG. 3 shows the engine deck 6a of FIG. 2 with the engine deck skin 2i, which forms the engine accommodating region 7 above the fuselage 2, which accommodates the two aircraft engines 11a, 11b within the firewall arrangement 10. The aircraft engine 11a is arranged in the engine compartment 20a and the aircraft engine 11b is arranged in the engine compartment 20b. However, in contrast to FIG. 2 the engine deck 6a is shown without the cowling 8 of FIG. 2.

Preferably, each aircraft engine 11a, 11b is at least mounted to associated engine mounts 20d provided in the associated engine compartment 20a, 20b. The engine mounts 20d which are associated with the aircraft engine 11b are further illustrated in FIG. 4 and FIG. 5. However, the aircraft engines 11a, 11b are not described in detail. In fact, the aircraft engines 11a, 11b may be implemented by engines that are well-known to the person skilled in the art so that a detailed description thereof can be omitted, for brevity and conciseness.

The aircraft engines 11a, 11b are accommodated in the firewall arrangement 10 having the front firewall 10a, the rear firewall 10b, and the mid firewall 10c of FIG. 2, as well as an associated lower firewall. Illustratively, a lower firewall 30a, 30b is provided for each engine compartment 20a, 20b. In other words, the engine compartment 20a includes the lower firewall 30a, and the engine compartment 20b includes the lower firewall 30b. For simplicity and conciseness, only the lower firewall 30b is described hereinafter as a representative example of an inventive lower firewall. However, it should be noted that the lower firewall 30a is preferably embodied and mounted similarly, at least within predetermined manufacturing tolerances.

According to one aspect, the lower firewall 30b is arranged between the aircraft engine 11b and the engine deck skin 2i, i.e. the upper primary skin 2c of the fuselage 2. Illustratively, the lower firewall 30b is funnel-shaped and converges from an outer perimeter 31 to at least one inner collecting point 33. The outer perimeter 31 is preferably at least attached to the front firewall 10a and the rear firewall 10b and, preferentially, also to the mid firewall 10c. More specifically, the outer perimeter 31 is preferably removably attached to the front firewall 10a, the rear firewall 10b, and/or the mid firewall 10c. Accordingly, the funnel-shaped lower firewall 30b is uninvolved in the global load carrying of the fuselage 2.

The at least one inner collecting point 33 is illustratively arranged within a center portion 32 of the funnel-shaped lower firewall 30b. Preferably, the at least one inner collecting point 33 of the funnel-shaped lower firewall 30b comprises a drainage hole 34.

However, it should be noted that other embodiments of the funnel-shaped lower firewall 30b are likewise contemplated. For instance, the funnel-shaped lower firewall 30b may have two or more inner collecting points and, consequently, two or more associated funnel-shaped structures that are combined in the funnel-shaped lower firewall 30b.

Figure 4:
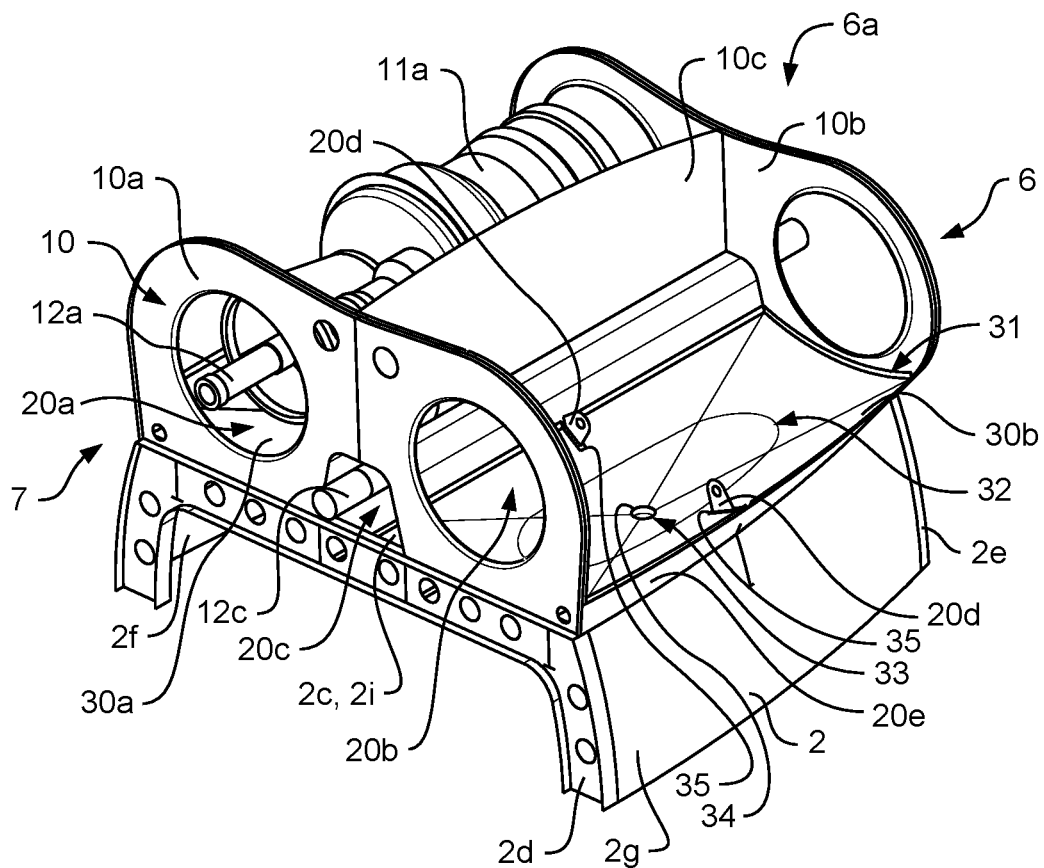
FIG. 4 shows a perspective view of the engine accommodating region of FIG. 3 with only one engine.

FIG. 4 shows the engine deck 6a of FIG. 3 that forms the engine accommodating region 7 with the firewall arrangement 10 above the fuselage 2. The firewall arrangement 10 accommodates the aircraft engine 11a in the engine compartment 20a. However, in contrast to FIG. 3 the aircraft engine 11b is removed from the engine compartment 20b that includes the funnel-shaped lower firewall 30b.

Preferably, the funnel-shaped lower firewall 30b covers an entire footprint of the engine compartment 20b. Therefore, the funnel-shaped lower firewall 30b is connected at its outer perimeter 31 to the front firewall 10a, the rear firewall 10b, and the mid firewall 10c of the firewall arrangement 10. Furthermore, the funnel-shaped lower firewall 30b is also connected, preferentially attached, at its outer perimeter 31 to a lateral lower firewall mount 20e. This lateral lower firewall mount 20e may e.g. be integrated into the side shell 2g of FIG. 3 of the fuselage 2.

By way of example, the funnel-shaped lower firewall 30b comprises at least one and, illustratively, two receiving slots 35. These receiving slots 35 are adapted to receive the engine mounts 20d of FIG. 3 such that the engine mounts 20d are accessible in the engine compartment 20b.

Figure 5:
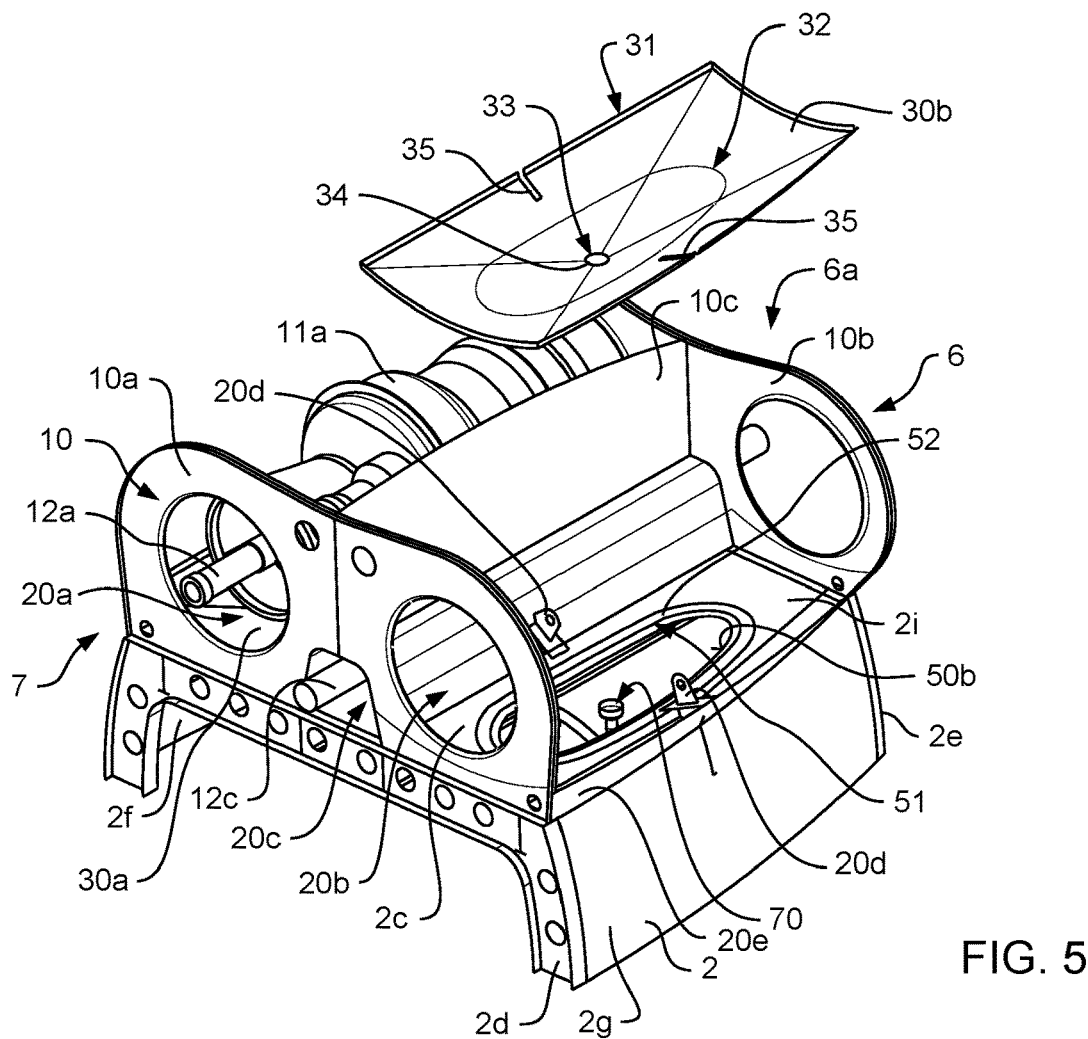
FIG. 5 shows a perspective view of the engine accommodating region of FIG. 3 with only one engine and with a disassembled lower firewall.

FIG. 5 shows the engine deck 6a of FIG. 3 with the engine deck skin 2i, which forms the engine accommodating region 7 with the firewall arrangement 10 above the fuselage 2. The firewall arrangement 10 accommodates the aircraft engine 11a in the engine compartment 20a. However, in contrast to FIG. 3 the aircraft engine 11b is removed from the engine compartment 20b and the funnel-shaped lower firewall 30b with the center portion 32 is also disassembled from the engine compartment 20b.

Preferably, the funnel-shaped lower firewall 30b comprises a fire proof material, including at least one of titanium, steel, ceramics, a polymeric composite, or a hybrid organic-inorganic composite. In one realization, the funnel-shaped lower firewall 30b has a titanium skin with a minimum thickness of 0.4 mm, preferably with a thickness in a range from 0.6 mm to 0.8 mm.

By way of example, the receiving slots 35 of FIG. 4 of the funnel-shaped lower firewall 30b for the engine mounts 20d of FIG. 4 are arranged laterally on the funnel-shaped lower firewall 30b. The engine mounts 20d are connected to the engine deck skin 2i.

Illustratively, the engine deck skin 2i and, thus, the upper primary skin 2c of the fuselage 2, has a cut-out 50b with an inner perimeter 51. A respective number of provided cut-outs may depend on a given number of drainage holes provided in the funnel-shaped lower firewall 30b.

The cut-out 50b preferably spans over a range of 20% to 80% of the entire footprint of the engine compartment 20b located in the engine accommodating region 7. Preferentially, the cut-out 50b spans over at least approximately 35% of the entire footprint of the engine compartment 20b. The dimensions of the cut-out 50b illustratively correspond to the dimensions of the center portion 32 of the funnel-shaped lower firewall 30b. By way of example, the cut-out 50b has an ellipsoidal shape.

Preferably, the inner perimeter 51 of the cut-out 50b is equipped with a heat-resistant interconnection edge member 52 that preferably comprises a fire proof material. This heat-resistant interconnection edge member 52 is preferentially connected to the center portion 32 of the funnel-shaped lower firewall 30b, in mounted state. In other words, in the mounted state the center portion 32 of the funnel-shaped lower firewall 30b is arranged inside of the cut-out 50b.

A drainage system 70 is illustratively arranged on a lower side of the engine deck skin 2i. The drainage system 70 is preferably connectable to the funnel-shaped lower firewall's drainage hole 34.

Figure 6:
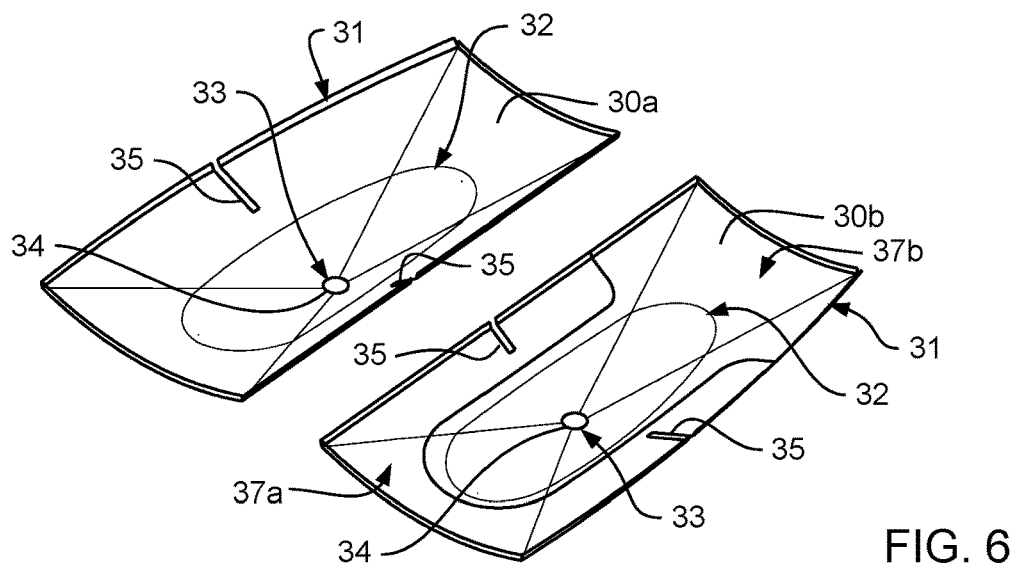
FIG. 6 shows a perspective view of both lower firewalls of FIG. 5.

FIG. 6 shows the funnel-shaped lower firewalls 30a, 30b of FIG. 5, which respectively converge from their outer perimeter 31 to their inner collecting points 33, wherein the outer perimeter is removably attachable in the associated engine compartment 20a, 20b of FIG. 5, and wherein the inner collecting points 33 respectively comprise the drainage holes 34 that are connectable to the drainage system 70 of FIG. 5. FIG. 6 also further illustrates the center regions 32 and the receiving slots 35 of each one of the funnel-shaped lower firewalls 30a, 30b.

At least one of the funnel-shaped lower firewalls 30a, 30b may be a monolithic or mono-material construction or, alternatively, a multi-material hybrid construction with at least two sections 37a, 37b with different composition. Accordingly, weight efficiency may be maximized and an underlying material choice may be adapted to respective local requirements.

Figure 7:
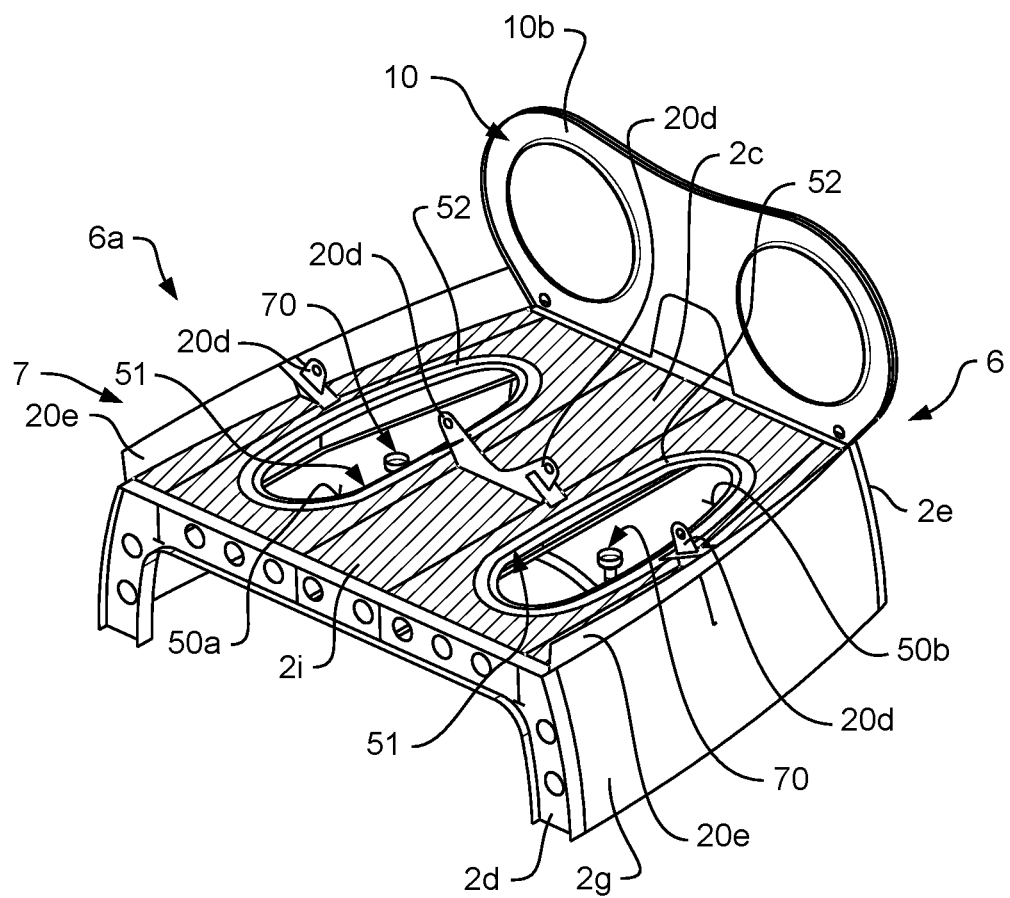
FIG. 7 shows a perspective view of the engine accommodating region of FIG. 3 without respective engine compartments.

FIG. 7 shows the engine deck 6a of FIG. 3 with the engine deck skin 2i, which forms the engine accommodating region 7 with the firewall arrangement 10 above the fuselage 2. However, in contrast to FIG. 3 the engine compartments 20a, 20b are removed, as well as the firewall arrangement 10, except the rear firewall 10b.

By way of example, FIG. 7 further illustrates the engine mounts 20d of FIG. 3, which are connected to the engine deck skin 2i, which is integrated into the upper primary skin 2c of the fuselage 2, and preferably also to longitudinal beams (2k in FIG. 8) below the upper primary skin 2c. The engine deck skin 2i and, more generally, the upper primary skin 2c preferentially comprises a polymeric composite, in particular a carbon fiber reinforced polymer.

Moreover, FIG. 7 also further illustrates the cut-out 50b with the inner perimeter 51 and the heat-resistant interconnection edge member 52 which is associated with the funnel-shaped lower firewall 30b of FIG. 6. Similarly, another cut-out 50a in the engine deck skin 2i is provided for the funnel-shaped lower firewall 30a of FIG. 6. Accordingly, the cut-out 50a is similarly formed with the inner perimeter 51 and the heat-resistant interconnection edge member 52.

Figure 8:
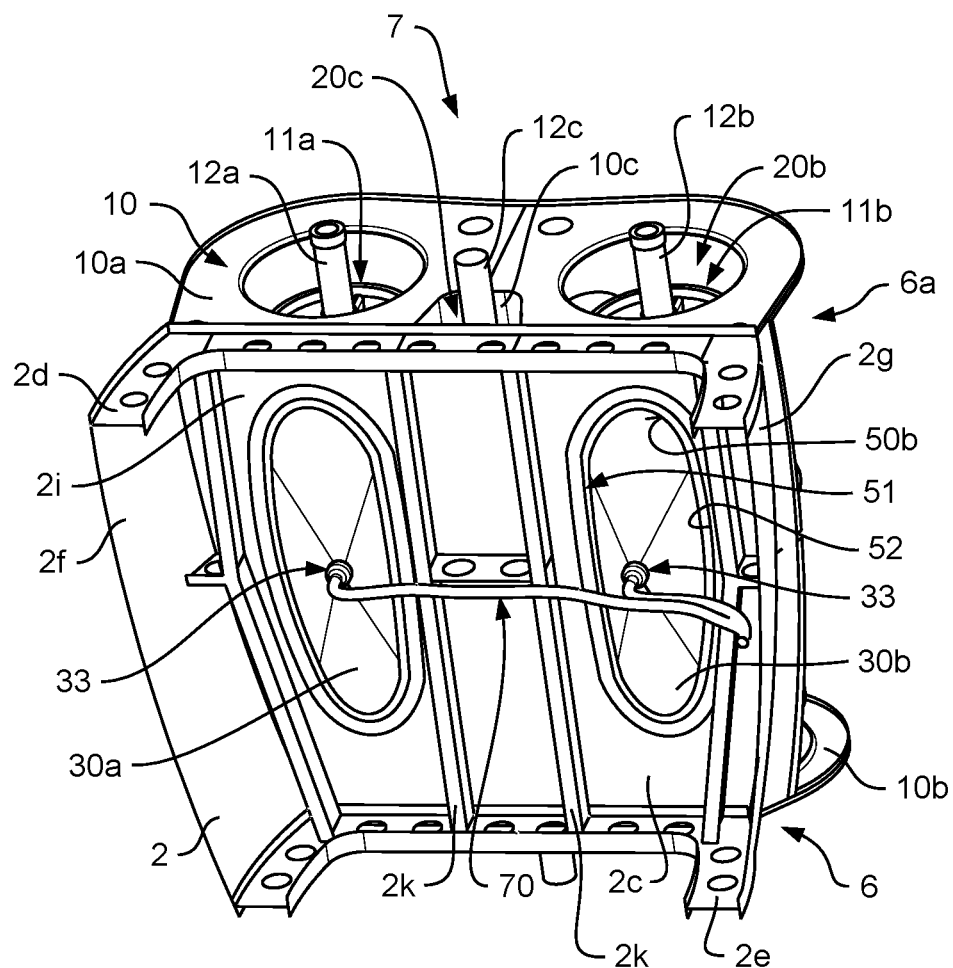
FIG. 8 shows a perspective view of the engine accommodating region of FIG. 3 seen from an aircraft interior region.

FIG. 8 shows the engine deck 6a of FIG. 3 with the engine deck skin 2i, which forms the engine accommodating region 7 with the firewall arrangement 10 above the fuselage 2. The firewall arrangement 10 accommodates the aircraft engines 11a, 11b in the engine compartments 20a, 20b. The engine compartments 20a, 20b are provided with the funnel-shaped lower firewalls 30a, 30b having the inner collecting points 33 of FIG. 3 and FIG. 6.

Illustratively, the inner collecting points 33 of both funnel-shaped lower firewalls 30a, 30b are connected to associated tubes or pipes of the drainage system 70 of FIG. 5 and FIG. 7. More specifically, the drainage system 70 is preferably connected in a fluid-tight manner to the inner collecting points 33 of both funnel-shaped lower firewalls 30a, 30b. The drainage system 70 is preferentially suitable for draining hot and flammable fluids.

Preferably, the drainage system 70 is at least partially arranged inside of the aircraft inner region 2a, 2b of FIG. 1, which is formed by the fuselage 2. Accordingly, the drainage system 70 is at least partially arranged below the engine deck skin 2i.

Illustratively, the engine deck skin 2i is supported by the frames 2d, 2e of FIG. 3, as well as by longitudinal beams 2k. Preferably, the frames 2d, 2e and the longitudinal beams 2k are interconnected as parts of the fuselage 2 and they contribute to global load carrying. Advantageously, the engine mounts 20d of FIG. 3 are connected to the longitudinal beams 2k.

Figure 9:
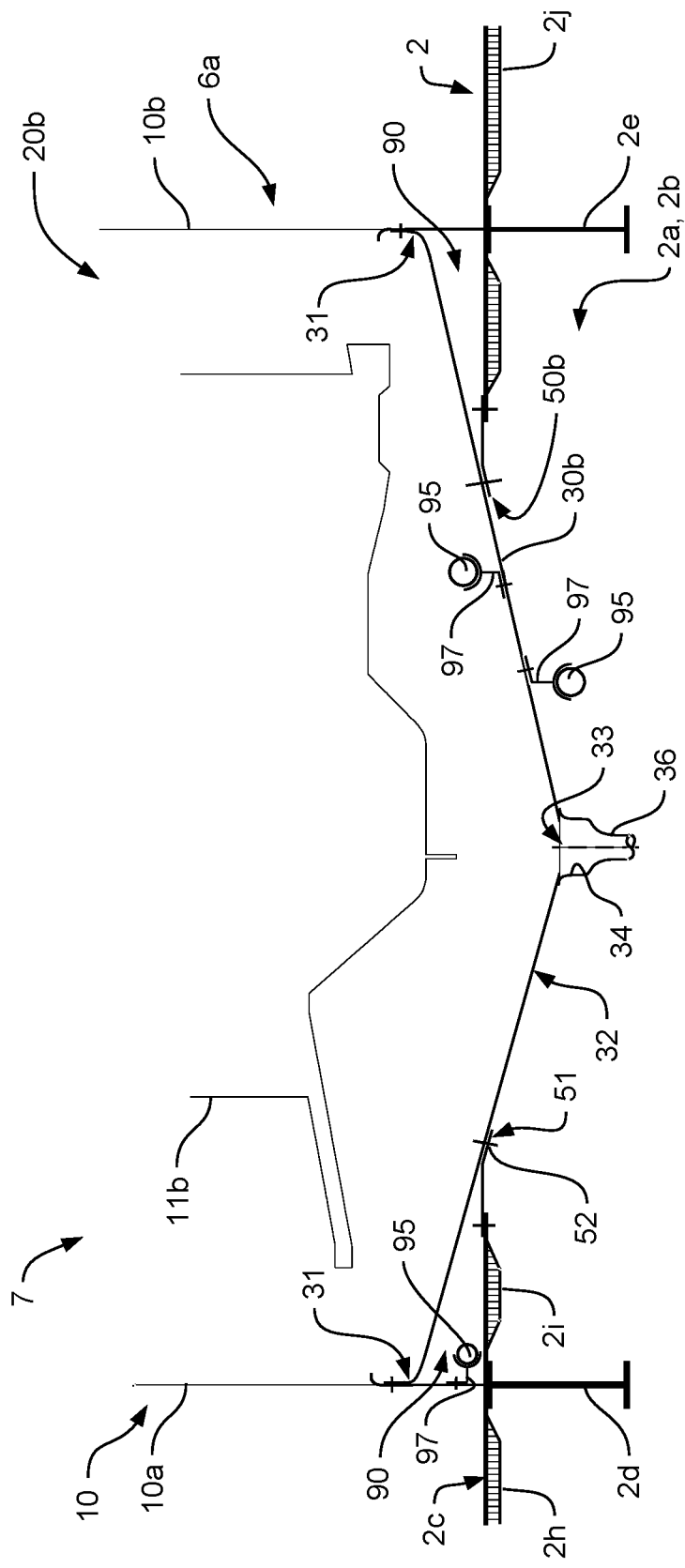
FIG. 9 shows a simplified sectional view of an engine compartment of the engine accommodating region of FIG. 3.

FIG. 9 shows the engine compartment 20b of the engine deck 6a of FIG. 3 with the aircraft engine 11b. The engine deck 6a includes the engine deck skin 2i and forms above the fuselage 2 the engine accommodating region 7 with the firewall arrangement 10 that includes the funnel-shaped lower firewall 30b of FIG. 3 to FIG. 8. The funnel-shaped lower firewall 30b has the inner collecting point 33 with the drainage hole 34 within the center portion 32. The firewall arrangement 10 accommodates the aircraft engine 11b in the engine compartment 20b above the fuselage 2, which forms the aircraft interior region 2a, 2b. The engine deck skin 2i in the engine compartment 20b has the cut-out 50b with the inner perimeter 51 and the heat-resistant interconnection edge member 52.

Preferably, the inner collecting point 33 within the center portion 32 of the funnel-shaped lower firewall 30b is arranged inside of the cut-out 50b such that inner collecting point 33 of the funnel-shaped lower firewall 30b is located inside of the aircraft interior region 2a, 2b. Illustratively, the funnel-shaped lower firewall 30b contacts the engine deck skin 2i at the heat-resistant interconnection edge member 52. Thus, on the one hand an air gap volume 90 is created between the outer perimeter 31 of the funnel-shaped lower firewall 30b and the engine deck skin 2i as the outer perimeter 31 is spaced apart from the engine deck skin 2i of the fuselage 2, and, on the other hand, the drainage hole 34 at the inner collecting point 33 is located inside of the aircraft interior region 2a, 2b.

Preferably, the drainage hole 34 is provided with an outlet 36. The outlet 36 is preferentially connected in a fluid-tight manner to the drainage system 70 of FIG. 8.

Moreover, according to one aspect the funnel-shaped lower firewall 30b forms a carrier element for at least one aircraft system component 95 above and/or below of the funnel-shaped lower firewall 30b. Illustratively, the at least one aircraft system component 95 is mounted to the funnel-shaped lower firewall 30b by means of a suitable carrier 97, which may also, or additionally, be arranged within the air gap volume 90. By way of example, the at least one aircraft system component 95 may be a pipe, a harness, or a connector.

The at least one aircraft system component 95 can either be routed above or below the funnel-shaped lower firewall 30b and, hence, inside the engine compartment 20a, 20b or inside of the aircraft interior region 2a, 2b. The engine deck skin 2i is preferentially flat and formed as a continuation of the upper primary skin 2c between the front deck skin 2h and the rear deck skin 2j, or as an integral part of the upper primary skin 2c. In other words, the front deck skin 2h, the rear deck skin 2j, and the engine deck skin 2i are at least directly connected with each other to form a continuous skin, i.e. the upper primary skin 2c, which may also be integral and uninterrupted.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof.

REFERENCE LIST 1 rotary wing aircraft
1a multi-blade main rotor
1b, 1c rotor blades
1d rotor head
2 fuselage
2a cockpit
2b cabin
2c upper primary skin of fuselage
2d front frame of engine deck
2e rear frame of engine deck
2f, 2g fuselage side shells
2h front deck skin
2i engine deck skin
2j rear deck skin
2k longitudinal beams
3 tail boom
4 counter-torque device
4a tail rotor
5 fin
6 aircraft upper deck
6a engine deck
7 engine accommodating region
8 cowling
10 firewall arrangement
10a front firewall
10b rear firewall
10c mid firewall
11a, 11b aircraft engines
12a, 12b aircraft engine drive shafts
12c tail rotor drive shaft
20a, 20b engine compartments
20c tail rotor drive shaft channel
20d engine mounts
20e lateral lower firewall mounts
30a, 30b lower firewalls
31 outer perimeter of lower firewall
32 center portion of lower firewall
33 inner collecting point of lower firewall
34 drainage hole
35 engine mounts receiving slots
36 outlet
37a, 37b different sections of the lower firewall
50a, 50b cut-outs of upper primary skin
51 inner perimeter of cut-out
52 interconnection edge member at cut-out
70 drainage system
90 air gap volume
95 aircraft system component
97 system component carrier

What is claimed is:

1. A rotary wing aircraft with a fuselage that forms an aircraft interior region, the fuselage comprising an upper primary skin that separates the aircraft interior region from an aircraft upper deck arranged above the fuselage, wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region, wherein the firewall arrangement comprises at least one funnel-shaped lower firewall that is arranged between the at least one aircraft engine and the upper primary skin of the fuselage, wherein the at least one funnel-shaped lower firewall converges from an outer perimeter to at least one inner collecting point, wherein the outer perimeter is spaced apart from the upper primary skin of the fuselage; and wherein the upper primary skin of the fuselage contributes to global load carrying of the fuselage, and wherein the at least one funnel-shaped lower firewall is uninvolved in the global load carrying.

2. The rotary wing aircraft of claim 1, wherein the at least one funnel-shaped lower firewall forms a carrier element for at least one aircraft system component, wherein the at least one aircraft system component comprises at least one of a pipe, a harness, or a connector.

3. The rotary wing aircraft of claim 1, wherein the upper primary skin of the fuselage comprises at least one cut-out, wherein a center portion of the at least one funnel-shaped lower firewall is arranged inside of the at least one cut-out and wherein the at least one cut-out comprises an inner perimeter, wherein a heat-resistant interconnection edge member that comprises a fire proof material is arranged at the inner perimeter, and wherein the center portion of the at least one funnel-shaped lower firewall is connected to the heat-resistant interconnection edge member.

4. The rotary wing aircraft of claim 1, wherein the upper primary skin of the fuselage comprises at least one cut-out, wherein a center portion of the at least one funnel-shaped lower firewall is arranged inside of the at least one cut-out; and wherein the center portion of the at least one funnel-shaped lower firewall comprises the at least one inner collecting point that is arranged inside of the at least one cut-out of the upper primary skin such that the at least one inner collecting point is located inside of the aircraft interior region.

5. The rotary wing aircraft of claim 1, wherein the at least one inner collecting point of the at least one funnel-shaped lower firewall comprises a drainage hole that is connected to an associated drainage system.

6. The rotary wing aircraft of claim 1, wherein the at least one funnel-shaped lower firewall comprises a fire proof material, including at least one of titanium, steel, ceramics, a polymeric composite, or a hybrid organic-inorganic composite.

7. The rotary wing aircraft of claim 1, wherein the upper primary skin of the fuselage comprises a polymeric composite.

8. The rotary wing aircraft of claim 1, wherein the engine accommodating region comprises at least two adjacent engine compartments that are separated from each other by means of a mid firewall, each one of the at least two adjacent engine compartments comprising an associated funnel-shaped lower firewall.

9. The rotary wing aircraft of claim 1, wherein the firewall arrangement further comprises at least a front firewall and a rear firewall, and wherein the outer perimeter of the at least one funnel-shaped lower firewall is at least attached to the front firewall and the rear firewall.

10. The rotary wing aircraft of claim 9, wherein the outer perimeter of the at least one funnel-shaped lower firewall is removably attached to the front firewall and the rear firewall.

11. The rotary wing aircraft of claim 1, wherein the upper primary skin of the fuselage comprises at least one cut-out, wherein a center portion of the at least one funnel-shaped lower firewall is arranged inside of the at least one cut-out and wherein the at least one funnel-shaped lower firewall covers an entire footprint of an associated engine compartment located in the engine accommodating region.

12. The rotary wing aircraft of claim 11, wherein the at least one cut-out spans over a range of 20% to 80% of the entire footprint of the associated engine compartment located in the engine accommodating region.

13. A rotary wing aircraft with a fuselage that forms an aircraft interior region, the fuselage comprising an upper primary skin that separates the aircraft interior region from an aircraft upper deck arranged above the fuselage, wherein the aircraft upper deck comprises an engine accommodating region with a firewall arrangement, the engine accommodating region accommodating at least one aircraft engine within the firewall arrangement such that the firewall arrangement defines a fire proof separation at least between the at least one aircraft engine and the aircraft interior region, wherein the firewall arrangement comprises at least one funnel-shaped lower firewall that is arranged between the at least one aircraft engine and the upper primary skin of the fuselage, wherein the at least one funnel-shaped lower firewall converges from an outer perimeter to at least one inner collecting point, wherein the outer perimeter is spaced apart from the upper primary skin of the fuselage;

wherein the upper primary skin of the fuselage comprises at least one cut-out, wherein a center portion of the at least one funnel-shaped lower firewall is arranged inside of the at least one cut-out and wherein the funnel-shaped lower firewall covers an entire footprint of an associated engine compartment located in the engine accommodating region;

wherein the funnel-shaped lower firewall is made of at least one of titanium, steel, and ceramic;

wherein the upper primary skin of the fuselage comprises a carbon fiber reinforced polymer; and wherein the upper primary skin of the fuselage contributes to global load carrying of the fuselage, and the funnel-shaped lower firewall does not contribute to the global load carrying of the fuselage.

14. The rotary wing aircraft of claim 13, further comprising a fuselage having an aircraft interior region, the fuselage comprising an upper primary skin disposed between and separating the aircraft interior region from an aircraft upper deck arranged above the fuselage, the aircraft upper deck comprising an engine accommodating region with a firewall arrangement, the engine accommodating region accommodating an aircraft engine within the firewall arrangement such that the firewall arrangement defines a fire proof separation between the aircraft engine and the aircraft interior region, wherein the firewall arrangement comprises a funnel-shaped lower firewall disposed between the aircraft engine and the upper primary skin of the fuselage, wherein the funnel-shaped lower firewall converges from an outer perimeter to the inner collecting point, and wherein the outer perimeter is axially spaced from the upper primary skin of the fuselage.

15. The rotary wing aircraft of claim 14, wherein the upper primary skin of the fuselage has a cut-out, and wherein a center portion of the funnel-shaped lower firewall is disposed inside of the cut-out.

16. The rotary wing aircraft of claim 15, wherein the cut-out is defined by an inner perimeter, wherein a heat-resistant interconnection edge member comprising a fire proof material is disposed at the inner perimeter, and wherein the center portion of the funnel-shaped lower firewall is connected to the heat-resistant interconnection edge member.

17. The rotary wing aircraft of claim 15, wherein the center portion of the funnel-shaped lower firewall comprises the inner collecting point disposed inside of the cut-out of the upper primary skin such that the inner collecting point is located inside of the aircraft interior region.

\* \* \* \* \*